Figure 1:
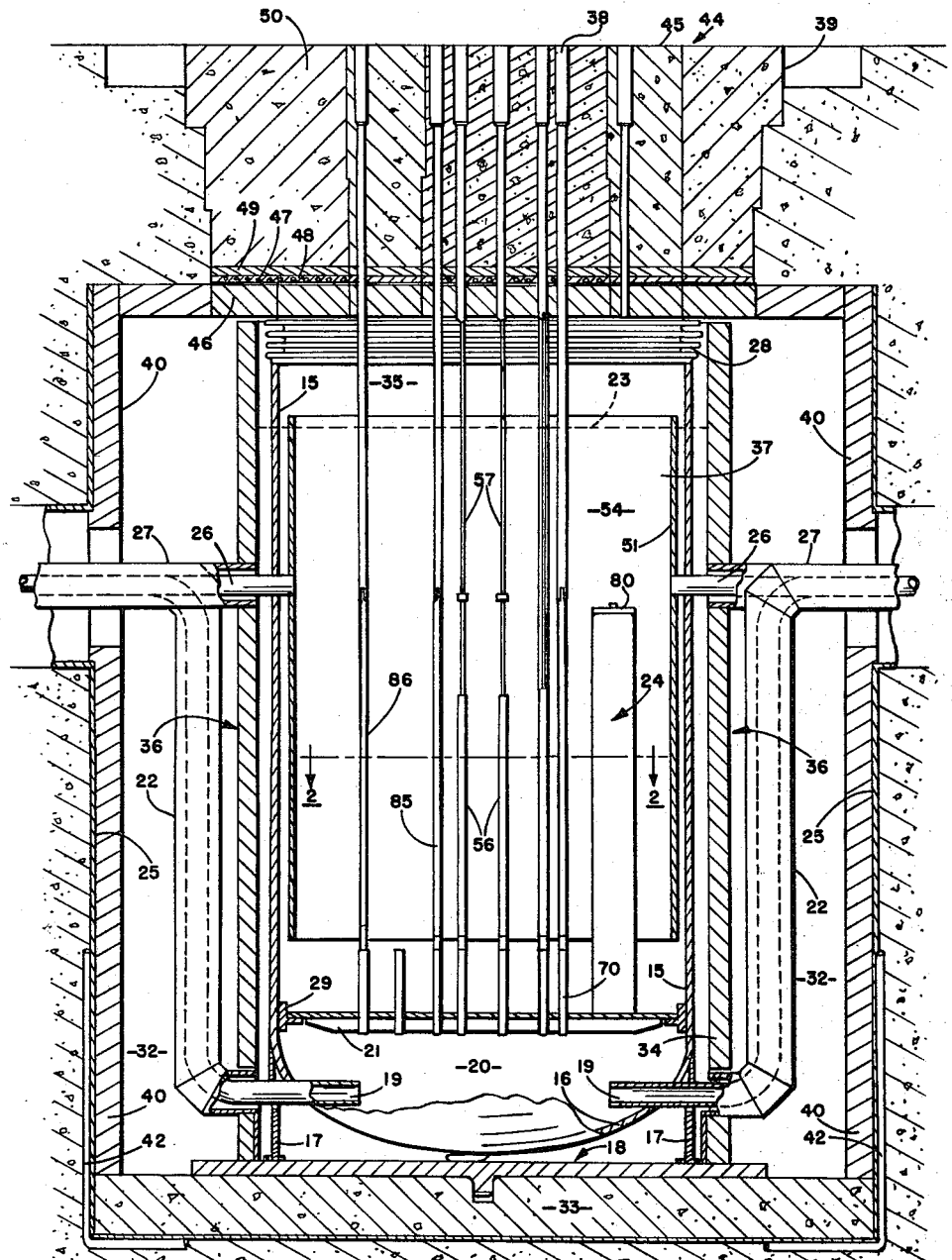

INVENTORS
EDWARD F. WEISNER
JOHN R. CHURCHILL
WILLIAM F. BANKS
BY

ATTORNEY

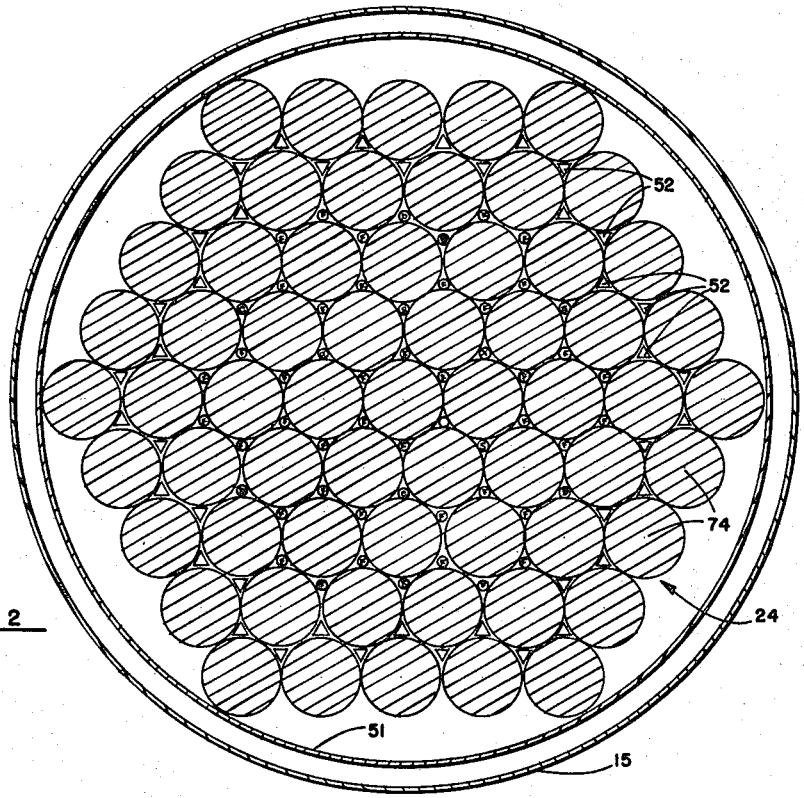
FIG. 2
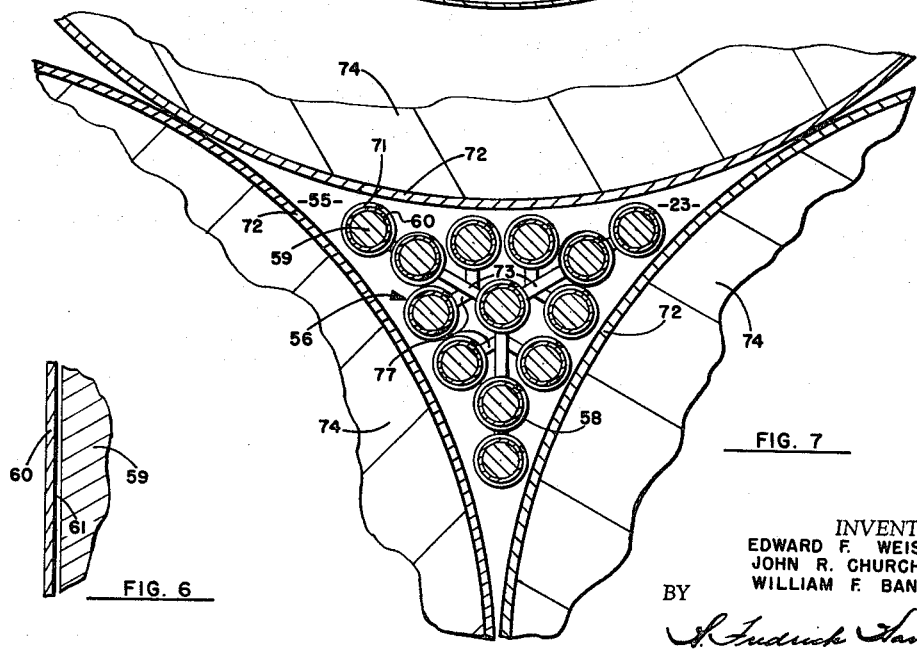
FIG. 6
FIG. 7
INVENTORS
EDWARD F. WEISNER
JOHN R. CHURCHILL
WILLIAM F. BANKS
BY
ATTORNEY June 1, 1965   E. F. WEISNER ETAL   3,186,913
GRAPHITE MODERATED NUCLEAR REACTOR
Filed May 18, 1960   3 Sheets-Sheet 3

INVENTORS
EDWARD F. WEISNER
JOHN R. CHURCHILL
WILLIAM F. BANKS
BY

ATTORNEY

United States Patent Office 3,186,913
Patented June 1, 1965

3,186,913
GRAPHITE MODERATED NUCLEAR REACTOR
Edward F. Weisner and John R. Churchill, Northridge, Calif., and William F. Banks, Washington, D.C., assignors to North American Aviation, Inc.
Filed May 18, 1960, Ser. No. 29,908
1 Claim. (Cl. 176—50)

The present invention is directed to nuclear reactors of the heterogeneous type and more particularly to graphite moderated-liquid metal cooled reactors.

Reactors of the heterogeneous type utilizing graphite moderators and liquid metal coolants have been described in detail in the art. For example, see "The Proceedings of the International Conference on Peaceful Uses of Atomic Energy," 1955; "The Sodium Reactor Experiment," by W.E. Parkins; and "Sodium Graphite Reactors," by Starr and Dickinson (Addison Wesley Publishing Company, 1958). The reactors described therein utilize hexagonal graphite moderating elements which are canned in stainless steel. The fuel elements are supported within a central opening in the moderating element which has a stainless steel liner. This type of moderator-fuel arrangement necessitates both an outer stainless steel or zirconium corrosion protection cladding on the graphite moderator and a central process tube of stainless steel or zirconium in which the fuel element is located. The hexagonal outer can of the moderating element entails a plurality of longitudinal welded seams as well as intricate welds at the ends to seal the inner process tube to the outer can of the moderating element. This large number of welds not only increases the cost of fabrication of each moderator element, but significantly increases the time required for testing the completed moderator element for leaks. A moderator can of this type is described on pages 139–143 of the above-referenced Starr et al. publication. This publication, on page 262, also describes a modification of the first type of moderator can in which the hexagonal shape is maintained but in which the corners of the moderator element are scalloped to provide space for process tubes within which the fuel elements are to be placed. Both of these designs utilize the hexagonal moderator element with consequent longitudinal welded seams, and require the use of separate process tubes with their resulting introduction into the core of additional neutron absorbing material. The present invention not only significantly reduces the neutron absorbing material in the core, but also removes all the neutron absorbing material from the high flux region at the center of each moderator element.

It is the primary object of this invention to reduce the number of welds required for each moderator can and provide a core arrangement which significantly reduces the amount of neutron absorbing cladding material, particularly in high flux regions, and, at the same time, increase the reliability and structural integrity of the moderator can.

It is another object of this invention to provide a core arrangement which reduces the neutron absorbing material content within the core while increasing the strength of the core elements.

It is another object of the present invention to provide a moderator element which has a minimum of cladding per unit volume of moderator and which is cheaper and easier to fabricate and test.

It is a further object of the present invention to provide a fuel element assembly which is adaptable to the cylindrical moderator configuration.

It is a further object of the present invention to provide a fuel assembly of triangular configuration which is adaptable to the core arrangement of cylindrical moderator elements.

It is a further object of the present invention to provide a moderator element for a reactor core which is independent of angular rotation upon insertion thereby facilitating simplified removal and replacement procedures.

It is a further object of the present invention to provide a core arrangement for a nuclear reactor in which fuel loading and unloading may be accommodated without changing moderator and reflector elements.

Figure 3:
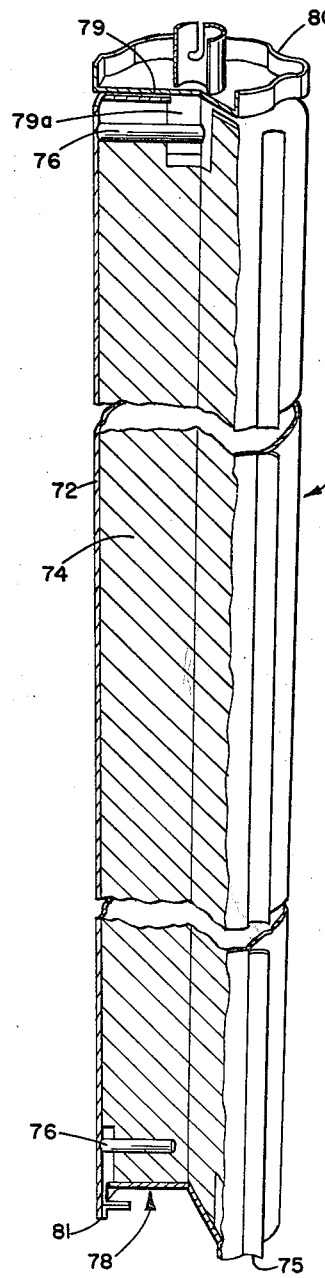
Figure 4:
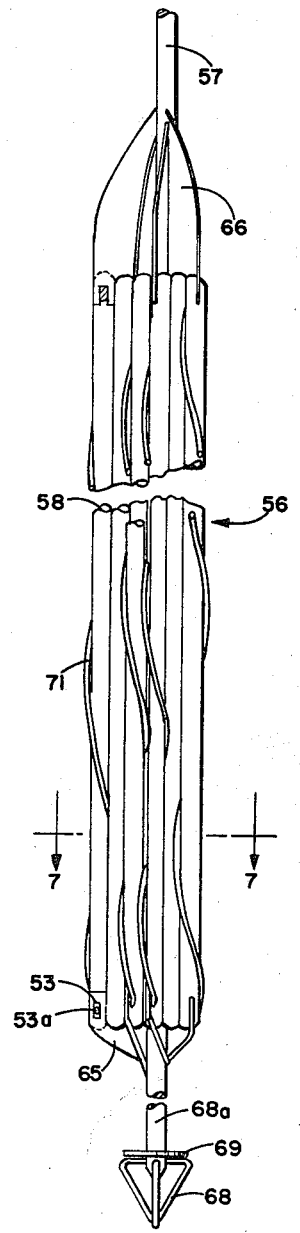
Figure 5:
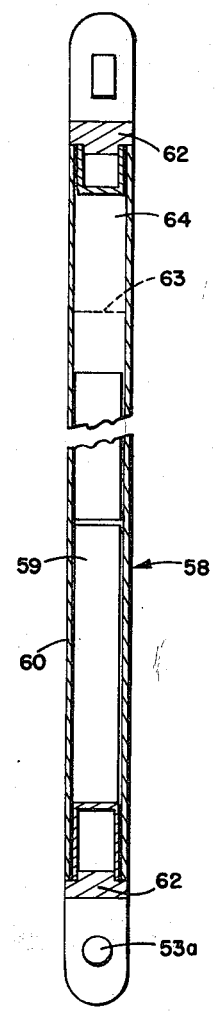

These and other objects will be more apparent from the following detailed description and drawings, hereby made a part of the specification, in which:

FIGURE 1 is a vertical section of the reactor of the present invention;
FIGURE 2 is a section along lines 2—2 of FIGURE 1;
FIGURE 3 is a partially sectioned perspective view of a moderator can;
FIGURE 4 is a view of the fuel element;
FIGURE 5 is a vertical section of a single fuel pin;
FIGURE 6 is an exploded view of a portion of one of the fuel pins showing the arrangement of cladding, NaK bond, and fuel slugs; and
FIGURE 7 is a sectional view of the relative arrangement of the fuel element along line 7—7 of FIGURE 4 and the moderator can.

The following chart of performance and design parameters is given as an example for the preferred embodiment of the present invention.

Table I (1) *Reactor operating data*

| | |
|---|---|
| Nominal rated output, mw. (thermal) | 38. |
| Average thermal flux in fuel, neutrons/sec.-cm.$^2$ | $3 \times 10^{13}$. |
| Peak thermal flux in fuel, neutrons/sec.-cm.$^2$ | $4 \times 10^{13}$. |

(2) *Materials*

| | |
|---|---|
| Fuel | Uranium metal, slightly enriched. |
| Moderator and reflector | Graphite, each cell canned in 0.015 in. thick cladding. |
| Fuel element cladding | 0.010 in. Type 304 stainless steel. |
| Primary coolant | Sodium. |
| Secondary coolant | Sodium. |
| Thermal shield | Mild steel. |
| Biological shield | High density concrete. |

(3) *Core nuclear data*

| | |
|---|---|
| Lattice type | Triangular. |
| Lattice spacing | 13.0 in. |
| Number of fuel cells | 42. |
| Nominal reflector thickness | 45 cm. |
| Core diameter (including reflector) | 8.5 ft. |
| Core height (including reflector) | 10.0 ft. |
| Initial conversion ratio | 0.55. |

Table I—Continued

(4) Fuel element data

| | |
|---|---|
| Type of fuel element | 13-rod cluster (triangular configuration.) |
| Number of elements in reactor | 42. |
| Fuel slug material | Uranium. |
| Diameter of uranium slugs | 0.5 in. |
| Length of fuel slug | 6.0 in. |
| Initial fraction $U^{235}$ in fuel | 0.025. |
| Weight of uranium in reactor | 2700 kg. |
| Fuel element length | 6.0 ft. |
| Jacket wall thickness | 0.010 in. of stainless steel. |
| Bond | 0.010 in. NaK. |

(5) Control and safety rod data

| | |
|---|---|
| Number of control rods | 4. |
| Type of rods | Boron steel rod operating inside of steel thimble. |
| Diameter of rods | 1.9 in. (4.8 cm.). |
| Total $\Delta k$ in control rods | 4%. |
| Number of safety rods | 4. |
| Total $\Delta k$ in safety rods | 6%. |

(6) Cooling system data

| | |
|---|---|
| Primary coolant | Sodium. |
| Inlet temperature | 500° F. |
| Mixed mean outlet temperature | 925° F. |
| Highest temperature out | 1100° F. |
| Maximum coolant velocity | 11.0 ft./sec. |
| Pressure drop across core | 6.7 p.s.i. |
| Flow rate | 984,000 lb./hr. |
| Maximum heat flux | 450,000 B.t.u./hr.-ft.$^2$ |
| Maximum fuel temperature | 1200° F. |
| Outlet temperature from heat exchanger | 500° F. |

Referring now to the drawings, FIGURE 1 shows the preferred embodiment of the reactor core of the present invention and comprises a core tank 15 which contains the reactor core and has ¾-inch thick walls of Type 304 stainless steel. The bottom 16 of tank 15 is semi-elliptical with a skirt 17 supporting the tank on a base 18. The coolant inlets 19 from both loops are connected to the plenum 20 formed between the semi-elliptical head and the grid plate 21. These inlet lines 19 descend in outer pipes 22 which are connected through an expansion joint to the outer tank 25. These inlet lines 19 turn into cells (not shown) at an elevation that maintains the sodium 23 level above the moderator cans 24 in case of a failure of the core tank 15. The sodium outlet pipes 26, located above the graphite, run horizontally into the heat exchanger cells (not shown). Pipes 26 are surrounded by an outer pipe 27 which is connected through an expansion joint to the outer tank or cavity liner 25.

At the top of the core tank 15 is a large bellows 28 to permit vertical expansion. This bellows is approximately 18 inches high and is fabricated from Type 321 stainless steel. A welded flange 29 near the bottom of the core tank 15 supports the steel grid plate 21.

The outer tank 25 is a flat bottom vessel fabricated from low alloy steel. The bottom serves to support the core tank 15 and the bottom thermal shield 18. The available space in the annular region 32 between the tanks 15 and 25 is such that the sodium 23 level cannot drop below the tops of the moderator and reflector elements 24 in the event of a leak in the core tank 15. This safety feature, which assures the presence of sodium coolant within the reactor core, is the primary function of the outer tank 25.

The side thermal shield 36 is fabricated from low-alloy steel plates approxiamtely 5½ inches thick. The plates are slipped into built-up corner columns and rest on the bottom thermal shield 18. The columns are fastened to the bottom thermal shield 18 and are welded to the thermal plates 34. Most of the heat generated in the thermal shield 36 and outer tank structure is radiated back to the core tank 15 through which it is conducted into the sodium 23.

The region between the thermal shield 36 and the cavity liner 25, approximately 24 inches in annular thickness at the side, contains 9 inches of block insulation 40 consisting principally of calcined diatomaceous silica and asbestos. To decrease the dusting during and subsequent to installation, the insulation blocks are coated with a solution of sodium silicate. The insulation is mounted by wire supports fastened to studs welded to the inside of the cavity liner 25. An atmosphere of nitrogen at 3 p.s.i.g. is maintained in this region during operation.

To heat the core tank 15 at the time of sodium filling, tubular type heater units are installed on the outside of the core tank 15. In addition, tubular heaters are suspended from special small plugs in the top shield and extend down into the fuel tubes of the reactor core. No other heaters are required on the reactor.

The cavity liner 25 is fabricated from low-alloy steel plates. Heat generated in the concrete and cavity liner and conducted across the insulation is removed by circulating coolant in pipes 42.

Separating the bottom thermal shield 18 and ordinary reinforced concrete pad is a layer of high temperature concrete 33. Around the side, and extending radially outward from the cavity liner, is a cylinder of reinforced concrete. The maximum estimated heat generation in this concrete transmitted to the wall of the cavity liner is 75 B.t.u./ft.$^2$-hr. from nuclear radiation. This is removed by the shield coolant in pipes 42 at the surface of the cavity liner, preventing excessive temperatures in the concrete.

The concrete in the rotatable shield 44 consists of an iron ore aggregate. This ore has a specific gravity of approximately 4.6 and is mixed in proportions leading to a concrete with a specific gravity of approximately 3.6.

The rotatable top shield 44 of concrete is incased in a Type 405 stainless steel form 39. The top stainless steel plate 45 on the shield is not welded to the many casings, which extend vertically through the shield. However, the plates at the sides and bottom are seal welded everywhere because these surfaces come in contact with the inert gas 35 and sodium vapor within the core tank 15. There are a total of 56 small plugs 38 extending through the top shield 44. In addition, there are five larger plugs, 24 inches in diameter, located to permit access for removal of any moderator can 24 within the core tank 15 when the shield 44 is rotated to the proper position and the proper plug is removed.

Approximately 1100 B.t.u./ft.$^2$-hr. of heat will be received by the underside of the top shield. About 85 percent of this is caused by thermal radiation from the hot sodium pool. The contribution from thermal radiation is reduced by the use of insulation 46, in the form of 13 horizontal stainless steel plates suspended from the shield. These plate assemblies are not gas-tight and will permit some sodium condensation on the seal plate at the bottom of the rotatable shield. The upper surface of the seal plate is in thermal contact with a lead layer 47, in which tubing 48 is imbedded for the circulation of organic coolant. Immediately above the lead layer 47 is a plate of low carbon steel 49 which serves as an additional thermal shield for the nuclear radiation. The heavy concrete 50 extends from this surface to the top of the rotatable shield. During normal operation, the bottom of the shield is at approximately 140° F.

All plugs 38 within the rotatable shield 44 are stepped to prevent radiation streaming. The step also serves as a means of mechanical support. Sodium vapor is free to diffuse up the annulus between each plug and its casing, but condenses in the low temperature region near the bottom of the shield. In all cases the final case seal on the plugs is made by O-rings compressed between the plug and the casing near the top of the shield. As an extra precaution a gasket is placed at the top lip of each plug, where it is available for maintenance without the necessity of lifting the plug. This retaining ring arrangement is used on all the plugs in the rotatable shield and performs the additional function of positively locking the plugs in place.

The reactor core, see FIGURE 2, is composed of an array of closely packed, canned, circular graphite cells 24, see FIGURE 3, contained in a stainless steel tank 15. The moderator and reflector graphite cells 24 are supported by a grid plate 21 near the bottom of the tank 15. The cells 24 are placed on a triangular lattice approximately 13 inches between centers. FIGURE 2 shows a cross section of the core arrangement of the present invention having a preferably hexagonal form with the individual moderator elements 24 (cladding not shown for simplicity) located on triangular centers in, preferably, abutting relation. The location of the forty-two loaded fuel channels is noted in FIGURE 2 by "F", with the location of the control rods and safety rods indicated by "C" and "S", respectively. The "D" and "X" indications of FIGURE 2 denote dummy fuel channels and the start-up neutron source, respectively. The filler elements 52 are canned reflector elements composed of the same materials as elements 24 and with a triangular cross section, located within the interstices 55 (see FIGURE 7) between elements 24. Elements 52 may be replaced by additional fuel elements 56 for higher core loadings without changes being required in the location or geometry of the outer layers of moderator or reflector elements 24. The location of the various fuel, control, and safety elements, as well as the dummy elements and neutron source, as shown in FIGURE 2, may be altered, since other locations also capable of sustaining criticality will be apparent to those skilled in the art. The region betwene the grid plate 21 and bottom 16 of the tank 15 forms a plenum chamber 20. Liquid sodium coolant is pumped into this chamber 20 and forced upward through the interstices 55 (see FIGURE 7) between the circular cans 24 to a pool 54 above the core.

An inert gas blanket 35 separates the pool 54 above the core from the upper thermal 46 and biological shielding 44. Fuel assemblies 56 are suspended from individual shield plugs 38 by hanger rods 57 which extend through the inert gas blanket 35 and pool 54 into the coolant channels 55.

The fuel elements 56 consist of clusters of 13 fuel rods 58 (see FIGURE 4). Each rod 58 (see FIGURE 5) consists of a 6-foot high column of 6-inch uranium slugs 59 in a thin-walled stainless steel jacket tube 60, thermally bonded by NaK alloy 61. The slugs 59 are 0.500 inch in diameter, the jacket tube 60 is 0.010 inch in wall thickness, and the NaK annulus 61 is 0.010 inch in average thickness (see FIGURE 6). The stainless steel jacket material is Type 304 (18 percent chromium and 8 percent nickel) and is closed at each end by a welded stainless steel plug 62. The NaK bonding alloy 61 extends a few inches above the slug column to a free surface 63 above which is argon gas 64 at atmospheric pressure. This space accommodates the thermal expansion of the NaK and accumulates fission gases during irradiation.

The thirteen rods forming each cluster are retained at their ends by spider 65. Support is provided by the fixture 66 at the top, while individual expansion of the rods is permitted at the lower end. The upper and lower end supports 65 and 66 are essentially identical. At the bottom of the assembly is a locating guide 68 and guide rod 68a, and an orifice plate 69 for controlling the flow of the sodium for each particular coolant channel 55.

These plates 69 fit into the tube 70 on grid plate 21 which admits the sodium from the lower plenum 20 into the core. In order to prevent the rods 58 from touching one another, the nine outer rods 58 of the cluster are spirally wrapped with a 0.062-inch diameter stainless steel wire 71. The thirteen rods 58 making up the fuel element assembly 56 are arranged in a triangular configuration with each rod 58 spaced from its nearest adjacent rod by wire 71. Support of the rods 58 in each fuel element assembly 56 is shown in detail in FIGURE 7 and consists of three radial supports 73 joined to the center rod 58, with each radial support 73 having a pair of branch supports 77 attached at a point spaced from the junction of radial supports 73. The radial supports are each connected to the end of two fuel tubes 58 while each branch support is connected to the end of one fuel tube 58. The supports 73 and 77 consist of sheet material longitudinally aligned with the flow of coolant. In this manner coolant flow is less impeded by the end supports than by the fuel tubes. The end supports 65 adjacent the coolant inlet also provide coolant directing means. The guide rod 68a and hanger rod 57 terminate within the supports 65 and 66, and the center fuel rod 58 is located in this position throughout the active length of the fuel assembly. The center fuel rod 58 is welded to both top and bottom fixtures 66 and 65 while the remaining fuel rods are welded, brazed, or otherwise firmly attached only at the top spider 65 and are supported within slots 53 by pins 53a. In this manner differential longitudinal expansion may take place downwardly without impairing the structural integrity of any of the rods 58. The wires 71 are welded or brazed to the ends of the individual fuel rods 58.

The thirteen rods making up the individual fuel element assemblies 56 are arranged in a triangular configuration (see FIGURE 7) with each rod 58 spaced from the nearest adjacent rod. This arrangement maximizes the fuel loading per channel 55 since it conforms to the general geometry of the channel without utilizing a process tube or similar neutron absorbing material introducing arrangement.

A disconnect is provided in the hanger rod 57 to facilitate the handling and storage of the fuel cluster from the plug 38 and hanger rod assembly.

The graphite moderator and reflector cans or elements 24 (see FIGURE 3) are separated from the sodium coolant 23 by stainless steel cylinders 72, 13 inches in diameter and with a 0.015 inch wall thickness, which sheath the individual solid cylindrical columns of graphite 74. Each graphite assembly is attached by stainless steel bolts 76 to a supporting pedestal 78 at the base of the can and to a spacer plate 80 at the top, both of stainless steel. The pedestal 78 at the bottom serves not only as a support for the can but may lock the element 24 vertically by rotation into a clamping arrangement attached to the grid plate. The spacer plate 80 at the top serves as a lifting fixture for the entire assembly and a means of lateral support. The spacer plate 80 is in contact with the spacers of all adjacent cans. The entire assembly of cans is clamped around the outside.

The graphite is machined from 13½ inch diameter logs. The reflector elements are the same as moderator elements. The circular cross section cylindrical cladding 72 is preferably preformed and the graphite inserted therein. Shrink fitting, or other techniques well known in the art, may be utilized to minimize gaps between the cladding 72 and the graphite 74. In this manner longitudinally welded seams generally required are essentially eliminated. After inserting or loading the graphite 74, only two circular welds are required, between support cylinder 81 of pedestal 78 and cladding 72 and between top plug 79a and top closure 79. The structural integrity of a circular cross section cylinder is far superior to other geometric arrangement, particularly in view of the drastic reduction in longitudinal welds. It is also apparent that the loading of preformed machined graphite logs is considerably simplified not only in their preparation, but also in facilitating the maintenance of small gaps between cladding 72 and graphite 74.

The amount of coolant which flows by the outer walls 72 of the elements 24 depends upon the position of the cans in the reactor. Orifice attachments 69 on the fuel elements adjust the flow to accommodate different heat generation rates. Strips 75 of stainless steel 0.015 inch thick may be attached to the moderator can walls 72, extending along their full length. When the can 24 is rotated into position, the strips 75 are pressed into contact with the walls at the adjacent can 24, preventing excessive cross-flow of sodium between cans.

There are four control elements 85 in the reactor core. This arrangement will permit a total of approximately 4 percent control in reactivity. Each control element is contained in a thimble assembly which extends from the top of the upper shield to a point just below the core. The thimble material is Type 304 stainless steel and in the core region it has a wall thickness of 0.049 inch. This arrangement makes possible a self-contained control rod assembly in which no sodium or sodium vapor contacts the moving mechanical parts.

There are four safety elements 86 in the reactor core. The total reactivity available in these elements is approximately 6 percent. The safety elements are similar to the control elements, except that greater clearance is allowed between cylinders and thimble in the safety elements. The thimble material is Type 304 stainless steel and in the core region has a thickness of 0.049 inch.

All piping is fabricated from Type 304 stainless steel with the joints welded. Consumable-type backing rings are used wherever possible. Piping in the sodium circuits is schedule 40, 6-inch diameter. Flexibility to accommodate thermal expansions is achieved by bends. In order to heat the piping and vessels for sodium filling, heaters and thermal insulation are attached to all surfaces. Sodium leak detecting cable is attached to the underside of the piping and vessels. Instrumentation in the form of thermocouples, electromagnetic flow meters, and pressure indicators is installed to indicate the performance of the sodium system during operation. Level indicators are used in the fill tanks and expansion tanks.

Gas vent pipes are connected to the sodium system to permit filling with sodium and to permit regulating the gas pressure over the free sodium surface in each expansion tank.

The core tank serves as the expansion tank for the primary loops. As a result, the level of sodium above the reactor core is dependent upon the sodium temperature. Over the temperature range to be expected during the operation, this sodium level will vary approximately 6 inches. The fill tank (not shown) for the primary system, which is empty when the sodium is in the reactor, is connected to the core tank by an unobstructed vent line and acts as a ballast to prevent large pressure variations caused by temperature or by sodium level changes. The secondary loops each have an expansion tank in which the gas pressure is regulated to ensure a higher sodium pressure in the secondary system than in the primary. Thus, if a leak should develop between the two systems, the flow of sodium would be toward the radioactive primary side. The gas vent lines contain vapor traps to condense any sodium vapor which might otherwise be transported into the gas vent system. In locations where it is possible that liquid sodium could be forced into such a line, a freeze trap is used to solidify the sodium and block the line. These freeze traps have heaters which can be used to melt the sodium, when required. The freeze trap prevents the sodium from solidifying in parts of the vent line which cannot be conveniently heated to reopen the line for gas flow.

Other components requiring coolant are served by a system which circulates an organic coolant that does not react with sodium. From a 500-gallon reservoir, the coolant is circulated by a pump. A throttle valve at each component to be served regulates the coolant flow to obtain a temperature increase of 30° F. from the 95° F. at which the coolant leaves the reservoir. Total heat thus removed is 950 kw. The return coolant is cooled in a heat exchanger before passing to the supply tank. The cold side of the exchanger is in parallel with the turbine condenser. Low carbon steel and pipe are used in this system.

Although a particular embodiment of the present invention has been described, various modifications will be apparent to those skilled in the art. Therefore, the present invention is not limited to the specific reactor core embodiment disclosed but only by the appended claim.

What is claimed is:

A core for a nuclear reactor comprising a core tank, a plurality of solid cylindrical graphite elements of circular cross section supported within said tank, cladding on said graphite elements, said elements being arranged on triangular centers, said graphite element arrangement defining a plurality of interstices of triangular configuration between said graphite elements, a plurality of fissionable material containing fuel elements supported within at least a portion of said interstices, a plurality of reflector filler elements within another portion of said interstices, said fuel elements and said filler elements having a triangular-shaped cross section, and means for removing heat from said core including a coolant adapted to pass through said interstices.

References Cited by the Examiner

UNITED STATES PATENTS

| | | | |
|---|---|---|---|
| 2,837,475 | 6/58 | Newson | 176—17 |
| 2,852,457 | 9/58 | Long et al. | 176—84 |
| 2,898,280 | 8/59 | Schultz | 176—78 |
| 2,902,422 | 9/59 | Hutter | 176—78 |
| 2,929,768 | 3/60 | Mahlmeister et al. | 176—41 |
| 2,990,352 | 6/61 | Finniston et al. | 176—82 |
| 3,081,247 | 3/63 | Balent | 176—84 |

FOREIGN PATENTS

| | | |
|---|---|---|
| 220,648 | 2/59 | Australia. |
| 1,197,912 | 6/59 | France. |
| 835,132 | 5/60 | Great Britain. |

OTHER REFERENCES

Parkins: Proceedings of the International Conference on the Peaceful Uses of Atomic Energy, 1955, Vol. III, pp. 295–306.

Starr: Proceedings of the International Conference on the Peaceful Uses of Atomic Energy, 1955, Vol. III, pp. 98–115.

Starr et al.: Sodium Graphite Reactors, September 1958, pp. 95–100, 139–143 and 256–278. Addison-Wesley Publishing Co., Inc., Reading, Mass.

German application No. 1,079,230, 4/60.

CARL D. QUARFORTH, *Primary Examiner.*

WILLIAM G. WILES, ROGER L. CAMPBELL,
*Examiners.*